United States Patent
Gao et al.

(10) Patent No.: US 10,331,135 B2
(45) Date of Patent: Jun. 25, 2019

(54) SYSTEMS AND METHODS FOR MANEUVERING AROUND OBSTACLES IN AUTONOMOUS VEHICLES

(71) Applicant: GM GLOBAL TECHNOLOGY OPERATIONS LLC, Detroit, MI (US)

(72) Inventors: Peter Gao, San Francisco, CA (US); Yiqi Gao, Mountain View, CA (US); Siddhartho Bhattacharya, San Jose, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/820,538

(22) Filed: Nov. 22, 2017

(65) Prior Publication Data

US 2018/0095465 A1    Apr. 5, 2018

(51) Int. Cl.
*G05D 1/00* (2006.01)
*G05D 1/02* (2006.01)
*B62D 15/02* (2006.01)
*G01C 21/34* (2006.01)

(52) U.S. Cl.
CPC ....... *G05D 1/0088* (2013.01); *B62D 15/0265* (2013.01); *G01C 21/34* (2013.01); *G05D 1/024* (2013.01); *G05D 1/0214* (2013.01); *G05D 1/0257* (2013.01); *G01C 21/3415* (2013.01); *G05D 2201/0213* (2013.01)

(58) Field of Classification Search
CPC .... G05D 1/0088; G05D 1/0214; G05D 1/024; G05D 1/0257; G05D 2201/0213; G01C 21/34; G01C 21/3415
USPC .......................................................... 701/23
See application file for complete search history.

(56) References Cited

U.S. PATENT DOCUMENTS

2018/0143641 A1*  5/2018  Rao ........................ G05D 1/0217
2018/0197029 A1*  7/2018  Ali ........................ G06K 9/00832

* cited by examiner

*Primary Examiner* — Marthe Y Marc-Coleman
(74) *Attorney, Agent, or Firm* — Lorenz & Kopf LLP (57) ABSTRACT

Systems and method are provided for controlling a vehicle. In one embodiment, an obstacle management method includes receiving, via sensing devices, sensor data relating to an environment associated with a vehicle, and determining, with the sensor data, the presence of an obstacle that at least partially obstructs an intended path of the vehicle in a first lane adjacent to a second lane and at least partially occludes a view of the second lane by a first sensing device. The method further includes positioning the vehicle with respect to the obstacle to improve the view of the second lane by the first sensing device without significantly obstructing the second lane, determining a second path that circumnavigates the obstacle and rejoins the intended path, and monitoring the opposing lane via the first sensing device to determine when the second path is clear.

20 Claims, 8 Drawing Sheets

SYSTEMS AND METHODS FOR MANEUVERING AROUND OBSTACLES IN AUTONOMOUS VEHICLES

TECHNICAL FIELD

The present disclosure generally relates to autonomous vehicles, and more particularly relates to systems and methods for maneuvering around double-parked cars and other such obstacles that an autonomous vehicle might encounter.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in autonomous vehicles, such vehicles might still be improved in a number of respects. For example, it is not unusual for an autonomous vehicle to encounter a double-parked vehicle or other such obstacle in its lane. In such cases, the obstacle might occlude to some extent the field of view of various sensing devices that are attempting to monitor oncoming traffic.

Accordingly, it is desirable to provide systems and methods for managing obstacles such as double-parked cars that might be encountered by an autonomous vehicle. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a first vehicle. In one embodiment, an obstacle management method includes receiving, via one or more sensing devices, sensor data relating to an environment associated with a vehicle, and determining, with the sensor data, the presence of an obstacle that at least partially obstructs an intended path of the vehicle in a first lane adjacent to a second lane (e.g., an opposing lane) and at least partially occludes a view of the second lane by a first sensing device of the one or more sensing devices. The method further includes positioning, with a processor, the vehicle with respect to the obstacle to improve the view of the second lane by the first sensing device without significantly obstructing the second lane. A second path that circumnavigates the obstacle and rejoins the intended path is determined, and the second lane is monitored via the first sensing device to determine when the second path is clear. The vehicle is then moved along the second path when it is determined that the second path is clear.

In one embodiment, the method further includes determining, while moving the autonomous vehicle along the second path, that the obstacle has begun to move; determining whether the vehicle has committed to the second path; completing the movement along the second path when it is determined that the vehicle has committed to the second path; and aborting the movement along the second path when it is determined that the vehicle has not committed to the second path.

In one embodiment, the first sensing device is a forward-facing radar sensor.

In one embodiment, the obstacle is a double parked vehicle.

In one embodiment, the method further includes estimating a length of the obstacle via the sensor data, and determining the second path in part based on the estimated length of the obstacle.

In one embodiment, estimating the length of the obstacle includes measuring, via lidar sensor data, a distance between opposing edges of the obstacle.

In one embodiment, the positioning the vehicle includes altering at least one of a pose and a position of the vehicle such that a portion of the vehicle partially extends beyond a line between the first lane and the second lane.

In one embodiment, the positioning of the vehicle is performed iteratively until the view of the second lane by the first sensing device is improved by a predetermined amount.

A system for controlling a vehicle in accordance with one embodiment includes an obstacle detection module, a positioning module, and a clearing module. The obstacle detection module, including a processor, is configured to: receive, via one or more sensing devices, sensor data relating to an environment associated with a vehicle; determine, with the sensor data, the presence of an obstacle that at least partially obstructs an intended path of the vehicle in a first lane adjacent to an second lane and at least partially occludes a view of the second lane by a first sensing device of the one or more sensing devices. The positioning module is configured to position, with a processor, the vehicle with respect to the obstacle to improve the view of the second lane by the first sensing device without significantly obstructing the second lane; and determine a second path that circumnavigates the obstacle and rejoins the intended path. The clearing module is configured to monitor the second lane via the first sensing device to determine when the second path is clear, and move the vehicle along the second path when it is determined that the second path is clear.

In one embodiment, the clearing module further determines, while moving the autonomous vehicle along the second path, that the obstacle has begun to move; determines whether the vehicle has committed to the second path; and completes the movement along the second path when it is determined that the vehicle has committed to the second path, and aborts the movement along the second path when it is determined that the vehicle has not committed to the second path.

In one embodiment, the first sensing device is a forward-facing radar sensor.

In one embodiment, the obstacle is a double parked vehicle.

In one embodiment, the positioning module further estimates a length of the obstacle via the sensor data, and determining the second path in part based on the estimated length of the obstacle.

In one embodiment, the length of the obstacle is determined by measuring, via lidar sensor data, a distance between opposing edges of the obstacle.

In one embodiment, the vehicle is positioned altering at least one of a pose and a position of the vehicle such that a portion of the vehicle partially extends beyond a line between the first lane and the second lane.

In one embodiment, the vehicle is positioned by iteratively changing the position and the pose of the vehicle until the view of the second lane by the first sensing device is improved by a predetermined amount.

An autonomous vehicle in accordance with one embodiment includes: a plurality of sensing devices that provide sensor data; and a controller that, by a processor and based on the sensor data, receives, via one or more sensing devices, sensor data relating to an environment associated with a vehicle; determines, with the sensor data, the presence of an obstacle that at least partially obstructs an intended path of the autonomous vehicle in a first lane adjacent to alane and at least partially occludes a view of the second lane by a first sensing device of the one or more sensing devices; positions, with a processor, the vehicle with respect to the obstacle to improve the view of the second lane by the first sensing device without significantly obstructing the second lane; determines a second path that circumnavigates the obstacle and rejoins the intended path; monitors the second lane via the first sensing device to determine when the second path is clear; and moves the vehicle along the second path when it is determined that the second path is clear.

In one embodiment, the first sensing device is a forward-facing radar sensor.

In one embodiment, the obstacle is a double parked vehicle.

In one embodiment, the controller is further configured to determine, while moving the autonomous vehicle along the second path, that the obstacle has begun to move; determine whether the vehicle has committed to the second path; and complete the movement along the second path when it is determined that the vehicle has committed to the second path, and aborts the movement along the second path when it is determined that the vehicle has not committed to the second path.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
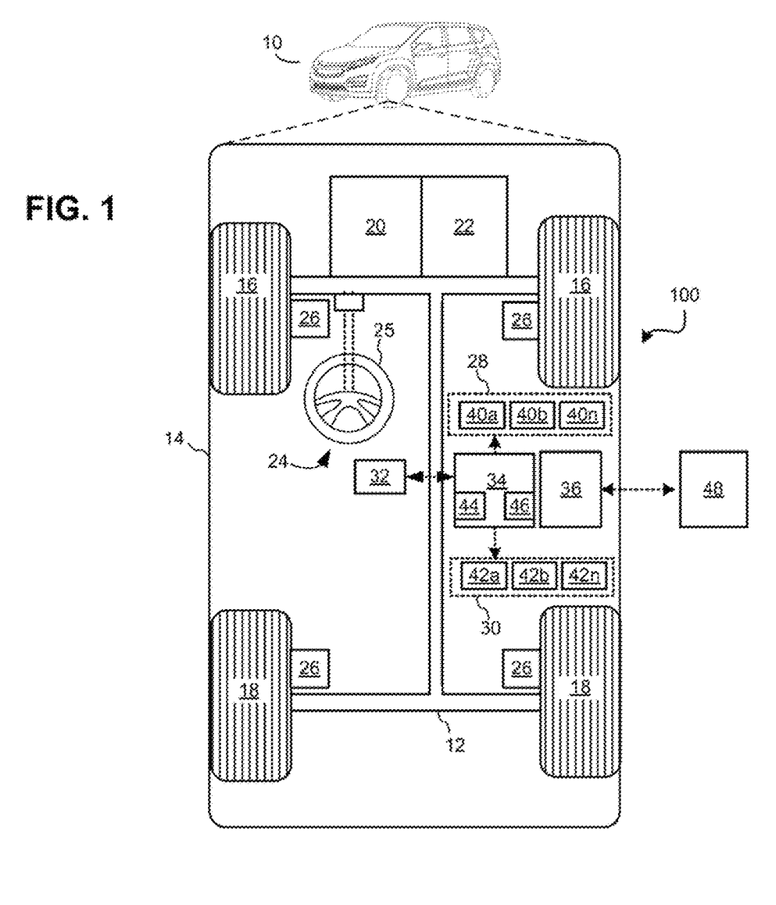
FIG. 1 is a functional block diagram illustrating an autonomous vehicle including an obstacle management system, in accordance with various embodiments.

With reference to FIG. 1, an obstacle management system shown generally as 100 is associated with a vehicle 10 in accordance with various embodiments. In general, obstacle management system (or simply "system") 100 allows for positioning vehicle 10 to reduce the occluding effect of an obstacle without significantly obstructing oncoming traffic, then monitoring oncoming traffic (e.g., via radar, lidar, etc.) to determine when an intended path is clear. Thus, system 100 implements what might be referred to herein as a "peek and clear" system that effectively "peeks" out behind view-obstructing obstacles and "clears" the way to complete the desired maneuver.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the obstacle management system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any vehicle in which the present subject matter may be implemented, regardless of its level of autonomy.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10 (such as the state of one or more occupants) and generate sensor data relating thereto. Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter. As used herein, the terms "forward," "rear," and "side" are used in the customary sense of directions relative to the orientation of the vehicle itself.

The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10. In various embodiments, controller 34 is configured to implement an obstacle management system as discussed in detail below.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 2:
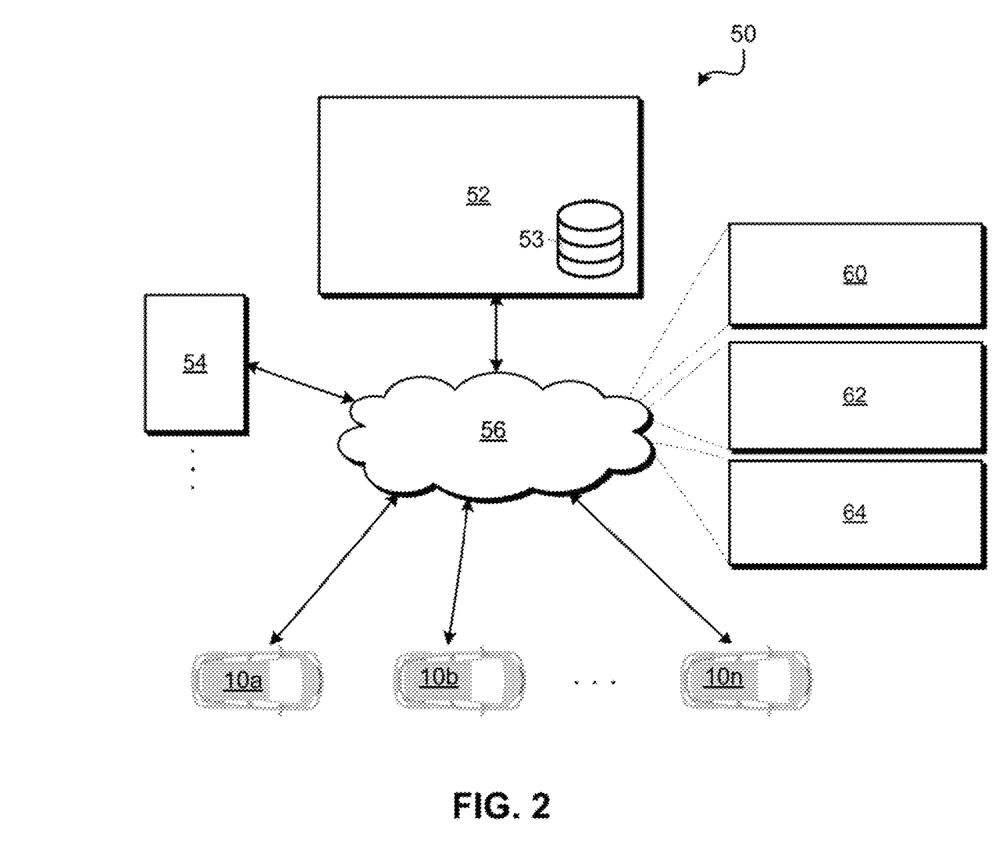
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous-vehicle-based remote transportation system. FIG. 2 illustrates an exemplary embodiment of an operating environment shown generally at 50 that includes an autonomous-vehicle-based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
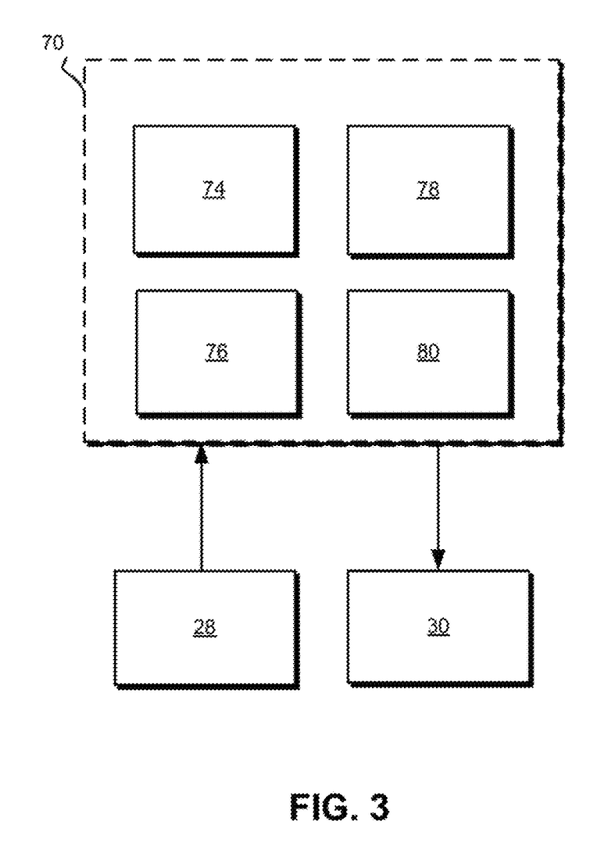
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes the acquired sensor data and predicts the presence, location, classification, and/or path of objects and features of the environment of the vehicle 10. In various embodiments, the computer vision system 74 can incorporate information from multiple sensors (e.g., sensor system 28), including but not limited to cameras, lidars, radars, and/or any number of other types of sensors.

The positioning system 76 processes sensor data along with other data to determine a position (e.g., a local position relative to a map, an exact position relative to a lane of a road, a vehicle heading, etc.) of the vehicle 10 relative to the environment. As can be appreciated, a variety of techniques may be employed to accomplish this localization, including, for example, simultaneous localization and mapping (SLAM), particle filters, Kalman filters, Bayesian filters, and the like.

The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
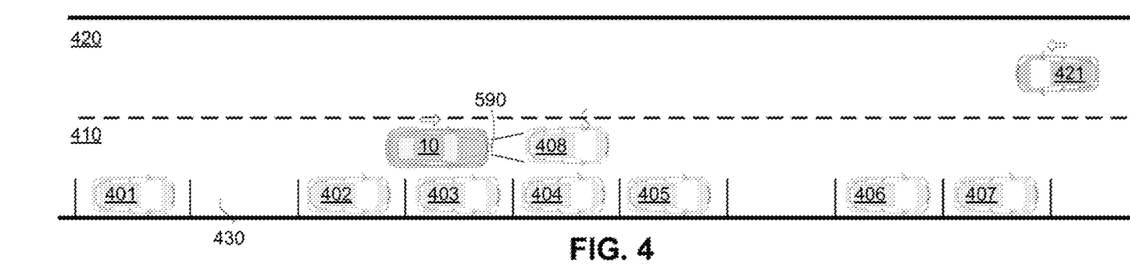
FIGS. 4-6 are successive, top-down views of an exemplary autonomous vehicle maneuvering around a double parked car, in accordance with various embodiments.
Figure 5:
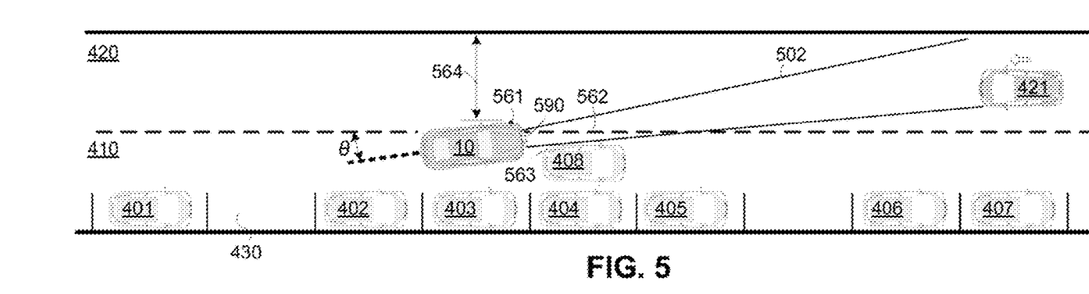
Figure 6:
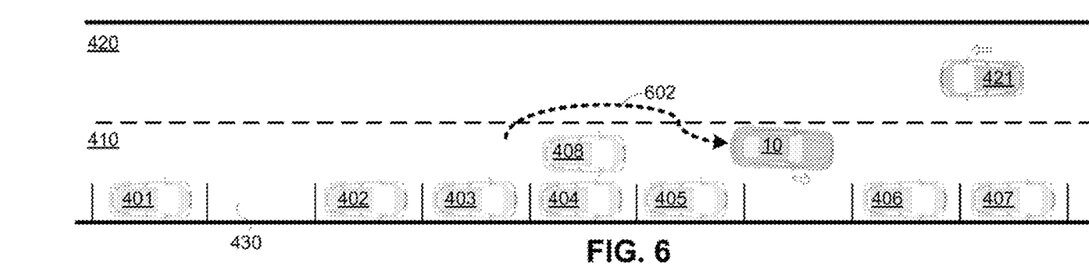

In various embodiments, all or parts of the obstacle management system 100 may be included within the computer vision system 74, the positioning system 76, the guidance system 78, and/or the vehicle control system 80. As mentioned briefly above, the obstacle management system 100 of FIG. 1 is configured to position AV 10 (perhaps iteratively) in such a way that reduces the occluding effect of an obstacle without significantly obstructing oncoming traffic, then monitors oncoming traffic (e.g., via radar, lidar, etc.) to determine when the intended path is clear (a technique referred to herein as "peek and clear"). FIGS. 4-6 present successive, top-down views of an example scenario useful in understanding the present subject matter. More particularly, FIG. 4 illustrates an AV 10 traveling in a lane 410 (adjacent to opposing lane 420) toward a double-parked vehicle (or simply "obstacle") 408—i.e., a vehicle that is parked, or is otherwise immobile for a reason other than waiting to enter the flow of traffic. Vehicle 408 is parked in such a way that vehicle 408 obstructs to a large extent further movement of AV 10 along lane 410. As will be understood, vehicle 408 is "double parked" in the sense that it is adjacent to another parked vehicle, that is, vehicle 404, which is itself parked within a parking space provided along a parking lane 430. Also illustrated in FIG. 4 are additional parked vehicles 401, 402, 403, 405, 406, and 407.

It will be appreciated that the position of vehicle 408 relative to AV 10 is such that vehicle 408 may, to some extent, block the view of one or more forward or side-facing sensors (such as front-mounted radar sensor 590) of AV 10, thus reducing the ability for AV 10 to observe oncoming traffic within adjacent lane 420. For example, AV 10 may not be able to entirely observe vehicle 421, which is illustrated as approaching in oncoming lane 420.

Referring now to FIGS. 5 and 6, an obstacle management system 100 in accordance with various embodiments is configured to position AV 10 in such a way that it reduces the occluding effect of vehicle 408 (with respect to one or more sensing devices) without significantly obstructing oncoming traffic in lane 420. In this regard, the phrase "without significantly obstructing" as used herein refers to a position and pose that would not prevent oncoming traffic from proceeding around or adjacent to AV 10. As used herein, the term "position" refers to the spatial location of AV 10 (e.g., in terms of GPS coordinates or the like), while the term "pose" refers to the orientation or "heading" of AV 10 using any convenient angular unit or directional indicators.

For example, as shown in FIG. 5, AV 10 has been positioned such that its left front corner 561 extends slightly across center line (or some other dividing line) 562 and its pose has been adjusted such that its longitudinal axis is non-parallel to center line 562 by a small angle θ. As illustrated, this change in position and pose results in a more efficacious field of view 502, allowing any front-mounted radar sensors (e.g., sensor 590) or other applicable sensors within sensor system 28 to monitor oncoming lane 420, including the speed, position, and acceleration of oncoming vehicles such as vehicle 421. Such applicable sensors might include, for example, side-facing or rear-facing radar, lidar, or optical sensors. It will be appreciated that AV 10 as illustrated in FIG. 5 does not extend into lane 420 in such a way that vehicle 421 would be prevented from continuing past vehicle 10 in lane 420. That is, a substantial width (564) of lane 420 remains available to vehicle 421.

Once AV 10 is positioned as shown in FIG. 5, obstacle management system 100 can then monitor oncoming traffic and determine when lane 420 is sufficiently clear that AV 10 may maneuver around or "circumnavigate" vehicle 408 along a path 602 as shown in FIG. 6 and rejoin the originally intended path (i.e., a path that continues straight along lane 410). It will be appreciated that the particular angles and positions illustrated in FIGS. 4-6 are not intended to be limiting, and that the present subject matter may be adapted to address a wide range of obstacles, lane geometries, and potential areas of interest that are advantageously observable by available sensors.

Figure 7:
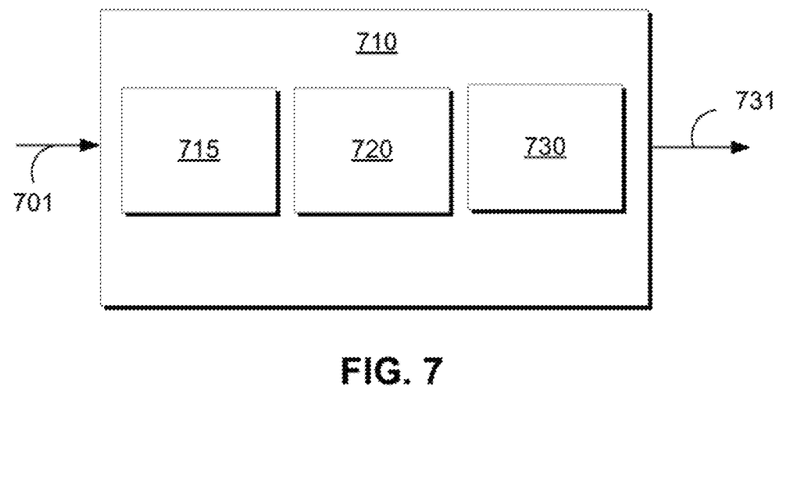
FIG. 7 is a dataflow diagram illustrating an obstacle management system of an autonomous vehicle, in accordance with various embodiments.

Referring now to FIG. 7, an exemplary obstacle management system 100 generally includes an obstacle management module (or simply "module") 710 that itself includes an obstacle detection submodule (or "module") 715, a positioning submodule (or "module") 720 and a clearing submodule (or "module") 730. In general, obstacle management module 710 receives sensor data 701 (e.g., optical camera data, radar sensor returns, lidar sensor returns, etc.) from which it can determine the presence of an obstacle obstructing the intended path of AV 10 (e.g., vehicle 408 in FIG. 4), and, after it determines that a path circumnavigating the obstacle is clear, produces an output 731 indicating that AV 10 may follow the second path around the obstacle to rejoin its intended path (as shown in FIG. 6).

Obstacle detection module 715 is configured to determine that obstacle 408 is a class of obstacle that a human driver, under ordinary conditions, might reasonably expect to drive around, such as a double-parked car or the equivalen. In some embodiments, obstacle 408 may not be strictly stationary but may be moving slowly and/or intermittently, such as may be the case with mail delivery vehicles and the like. Determination of this class of obstacle may use any suitable method, including various machine learning models trained to classify such obstacles based on sensor data 701. For example, module 715 may implement a convolutional neural network (CNN) or other classifier trained to recognize a wide range of such obstacles. Such a classifier may also take into account features such as the state of the parked vehicle's rear brakes, the state of the its emergency flashers, whether or not occupants are present within the vehicle, nearby signage and traffic control lights, whether or not there are one or more other vehicles in front of the obstacle, and any other such factors. In this regard, the systems and methods described herein are not limited to double-parked cars, and may apply to trash containers, construction vehicles, and any other obstacle that might prevent AV 10 from traveling along its intended path.

Positioning submodule 720 assists in adjusting the location and/or pose of AV 10 in such a way that the occluding effect of the obstacle is reduced or eliminated, without significantly obstructing the oncoming lane or lanes, as depicted and described above in conjunction with FIG. 5. Clearing submodule 730 is generally configured to monitor any oncoming traffic in the vicinity of AV 10 (e.g., in the oncoming lane 420) and determine whether AV 10 is clear to proceed, as shown in FIG. 6. Monitoring of oncoming traffic may be performed utilizing any suitable machine learning model acting in conjunction with sensor system 28. In some embodiments, as described below, clearing submodule 730 might include logic to determine a course of action to be taken when the putatively double-parked car is a "false positive"—e.g., the apparently "parked" vehicle begins moving after AV 10 has begun maneuvering along its intended path or it is unwise to maneuver around a large string of cards. One example of how this can be accomplished is always ensuring that there remains enough space for the vehicle to return to the original lane.

It will be understood that various embodiments of obstacle management system 100 according to the present disclosure may include any number of additional sub-modules embedded within the controller 34 which may be combined and/or further partitioned to similarly implement systems and methods described herein. Furthermore, inputs to the obstacle management system 100 may be received from the sensor system 28, received from other control modules (not shown) associated with the autonomous vehicle 10, received from the communication system 36, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

The various modules described above may be implemented as one or more machine learning models that undergo supervised, unsupervised, semi-supervised, or reinforcement learning and perform classification (e.g., binary or multiclass classification), regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), linear discriminant analysis models.

In some embodiments, training of any machine learning models used by system 100 occurs within a system remote from vehicle 10 (e.g., system 52 in FIG. 2) and is subsequently downloaded to vehicle 10 for use during normal operation of vehicle 10. In other embodiments, training occurs at least in part within controller 34 of vehicle 10, itself, and the model is subsequently shared with external systems and/or other vehicles in a fleet (such as depicted in FIG. 2). Training data may similarly be generated by vehicle 10 or acquired externally, and may be partitioned into training sets, validation sets, and test sets prior to training.

Figure 8:
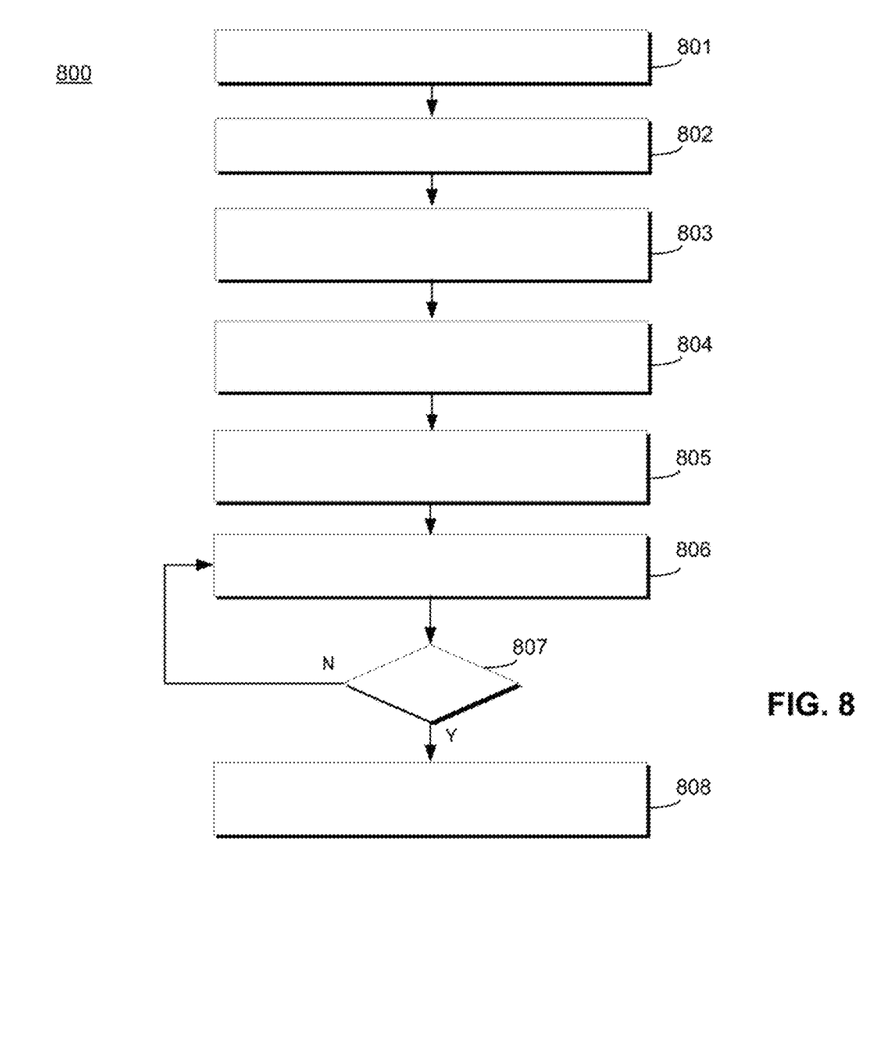
FIG. 8 is a flowchart illustrating a control method for controlling the autonomous vehicle, in accordance with various embodiments.

Referring now to FIG. 8, and with continued reference to FIGS. 1-7, the illustrated flowchart provides a control method 800 that can be performed by obstacle management system 100 in accordance with the present disclosure. As will be appreciated in light of the present disclosure, the order of operation within the method is not limited to the sequential execution as illustrated in the figure, but may be performed in one or more varying orders as applicable and in accordance with the present disclosure. In various embodiments, the method can be scheduled to run based on one or more predetermined events, and/or can run continuously during operation of autonomous vehicle 10.

In various embodiments, the method begins at 801, in which sensor data relating to the environment associated with AV 10 is received. As detailed above, this sensor data might be received from a variety of sensing devices, such as optical cameras, lidar sensors, radar sensors, etc. At 802, this sensor data is then used to determine the presence of an obstacle (e.g., vehicle 408), as described above and illustrated by way of example in FIG. 4. In one embodiment, obstacle detection module 715 detects an object that at least partially obstructs an intended path of the vehicle in one lane (e.g., lane 410) adjacent to an opposing lane (420) and at least partially occludes a view of the opposing lane by at least one sensing device of sensor system 28 (as depicted in FIG. 4). As will be appreciated, depending upon the size and shape of obstacle 408, some sensing devices of sensor system 28 might have a full view of opposing lane 420 (e.g., top-mounted cameras, lidar, etc.), while other sensing devices of sensor system 28 might have only a partial view of opposing lane 420 (e.g., front mounted cameras or radar sensors).

Accordingly, at 803, module 720 positions (or determines the necessary position of) AV 10 to reduce the occluding effect of the obstacle (as shown in FIG. 5). The position and/or pose of AV 10 after this procedure may, in various embodiments, diverge from what might be the nominal position and/or pose of AV if it were to be stopped behind a non-double-parked vehicle in normal traffic (e.g., while waiting at a traffic signal). FIG. 4, for example, illustrates what might be considered a nominal pose and position under such conditions. The range of vehicle positions and poses may vary, however, depending upon the nature of the obstacle, the nature of AV 10, the type of sensors being used to monitor oncoming traffic, the geometry of the lane in which AV 10 is traveling, and other characteristics of the environment, roadway, and surrounding objects. While the present embodiments are discussed in the context of oncoming traffic, the present systems and methods may also be employed in the context of adjacent traffic that is traveling in the same direction as AV 10. That is, referring briefly again to FIG. 4, it will be appreciated that the methods described above may also be employed in cases in which the direction of traffic in lane 420 is the same as lane 410 (i.e., to the right in the figure), and vehicle 421 is passing AV 10 from behind, rather than approaching in an opposite lane.

In some embodiments, positioning of AV 10 at 803 is performed iteratively. That is, module 720 may instruct AV 10 to make a minor adjustment in position, determine whether its field of view is satisfactory, make another minor adjustment, and so on, until its position and pose are adequate. Such iterative movement closely mimics the behavior of human drivers, who tend to successively "creep" up and around obstacles to achieve a better view of oncoming traffic. In the case of stationary obstacles, however, module 720 may know, a priori, enough information regarding the geometry of the obstacle and lanes that the desired position and pose for AV 10 may be determined via an open-loop process.

Figure 9:
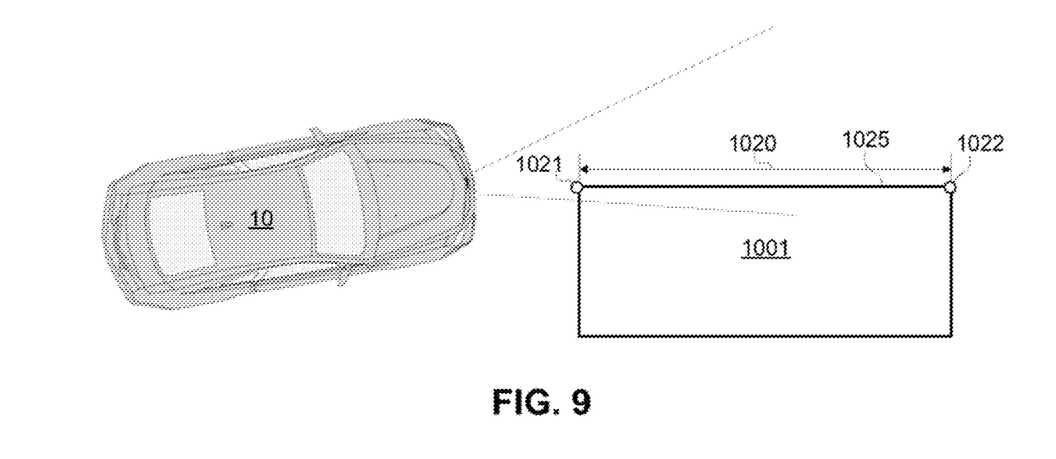
FIG. 9 is a top-down view of an autonomous vehicle attempting to determine the length of an obstacle, in accordance with various embodiments.
Figure 10:
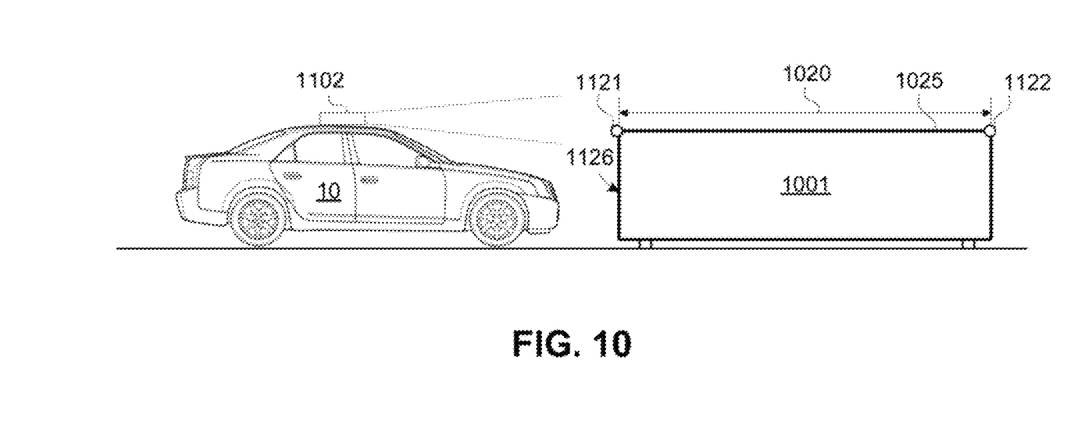
FIG. 10 is a side view of an autonomous vehicle attempting to determine the length of an obstacle, in accordance with various embodiments.

At 804 the length of the obstacle may be estimated to assist in determining the optimal path around the obstacle. In some embodiments, the length (e.g., a characteristic distance along an axis parallel to the intended path of AV 10) may first be set to a default value (e.g., the maximum expected length of a typical vehicle), and then refined by geometrically analyzing the obstacle using any suitable sensors (such as lidar and/or radar). Referring to FIG. 9, for example, front mounted sensors on AV 10 may be used to observe a far corner 1022 and a near corner 1021 of a side 1025 of obstacle 1001, thus allowing AV 10 to estimate the length 1020. Alternatively, or in addition to the above technique, top mounted sensors 1102 as shown in FIG. 10 may be used to observe far edge 1122 and near edge 1121 of top surface 1025, thus allowing the length 1020 to be estimated. In yet another embodiment, the facing surface 1126 (as seen through a camera or other sensor) of obstacle 1001 may be used to classify obstacle 1001, e.g., via a convolutional neural network trained using a training set of known obstacle types (cars, trucks, trash bins, etc.). Knowing the class of obstacle 1001, obstacle management module 710 may then consult a database (e.g., a table) of such obstacle classes and known dimensions (stored locally or remotely) to estimate the length 1020 of obstacle 1001.

Referring again to FIG. 8, obstacle management module 710 then determines, at 805, a path that would allow AV 10 to maneuver around the obstacle (i.e., to "circumnavigate" the obstacle). Such a path is illustrated, for example, as path 602 in FIG. 6. As will be appreciated, the length and other geometric characteristics of this path will vary greatly depending upon a number of factors, such as the geometry of the roadway lanes (e.g., 410, 420), the geometry of the obstacle, the speed limit of the roadway, and the like. For example, the circumnavigating path may be constructed from a path that changes from lane 410 to lane 420, moves straight along segment adjacent to vehicle 408 in lane 420 that is longer by some predetermined buffer distance from the front end of vehicle 408, and which then changes back to lane 410 at an appropriate point.

Next, at 806, obstacle management module 710 monitors the opposing lane and relevant traffic, if any, as well as any objects in the vicinity that might be relevant to completion of the intended maneuvering path. Such objects might include, for example, a vehicle approaching AV 10 from behind that is simultaneously attempting to maneuver around the same obstacle, and which therefore might "cut off" AV 10 as it attempts to move along the intended maneuvering path. At 807, obstacle management module 710 determines whether the oncoming traffic is sufficiently clear that AV 10 may proceed around the obstacle. If so, then processing continues with 808, and AV 10 maneuvers around the obstacle and returns to its originally intended path. If the path is not sufficiently clear to circumnavigate the obstacle, then processing returns to 806, whereupon obstacle management module 710 continues to monitor oncoming traffic. In another embodiment, the system provides an option for calling for remote assistance, allowing a human operator to determine whether to go around the obstacle or redraw the intended path.

As used herein, the term "clear" with respect to a path generally refers to the case in which system 100 has determined that AV 10 may proceed along its intended path at a reasonable planned acceleration, velocity, etc. with a sufficient spatial margin remaining between AV 10 and any vehicles and objects in the vicinity of AV 10. Such a determination may be made by one or more modules within ADS 70 of FIG. 3.

Figure 11:
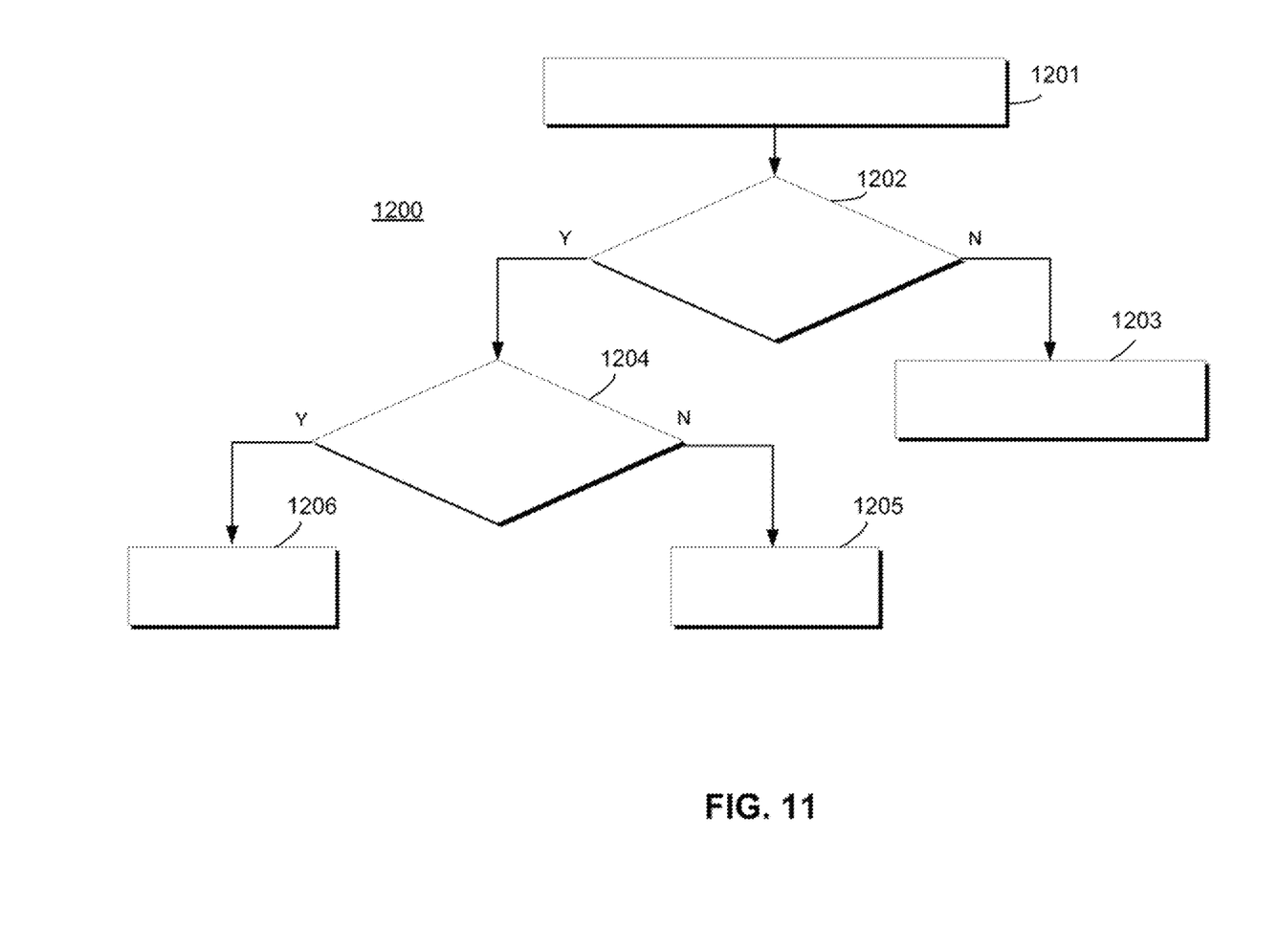
FIG. 11 is a flowchart illustrating a method for addressing false-positive determinations of a double-parked vehicle, in accordance with various embodiments.

As mentioned briefly above, obstacle management module 710 might be configured to handle the case of a "false positive" classification of the obstacle as a double-parked vehicle. Referring again to FIG. 6, consider the case in which vehicle 408 starts to continue forward in lane 410 while AV 10 is attempting to complete its maneuver around vehicle 408. FIG. 11 presents a flowchart addressing this scenario.

Specifically, in various embodiment the method 1200 begins at 1201, in which AV 10 begins maneuvering around the (presumed) double-parked vehicle 408 and continues to 1202, in which system 100 determines whether the classification of vehicle 408 as a double-parked vehicle is a false-positive, i.e., that the absolute velocity of vehicle 408 is non-zero or above some small threshold value. If not, the maneuver is completed as planned (1203); if so, processing continues to 1204, and the system 100 determines whether AV 10 is committed to the maneuver.

As used herein, the phrase "committed to the maneuver" refers to cases in which AV 10 has progressed along its path around the obstacle to the extent that it is more advantageous (using various heuristics or other criteria) to complete the maneuver around the obstacle (1206), possibly increasing velocity as necessary, rather than aborting the maneuver and returning to its lane and following its originally intended path (1205). This determination may take into account a number of factors, such as the position, speed, and acceleration of AV 10 relative to vehicle 408 at the moment that it determines that the obstacle has begun to move, the geometry (e.g., length and width) of obstacle 408, the geometry (e.g., width) of lane 410, the weather conditions (e.g., visibility, precipitation), the state of oncoming traffic, the nature of the obstacle, and any other factors deemed to be relevant. As mentioned above, in some embodiments an obstacle that moves intermittently (such as a mail truck that slowly moves in sequence from stop to stop) might nevertheless be considered an obstacle to be maneuvered around, notwithstanding the fact that it is not strictly stationary. Such an object would not be considered a false positive.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An obstacle management method comprising:
receiving, via one or more sensing devices, sensor data relating to an environment associated with a vehicle;
determining, with the sensor data, a presence of an obstacle that at least partially obstructs an intended path of the vehicle in a first lane adjacent to a second lane and at least partially occludes a view of the second lane by a first sensing device of the one or more sensing devices;
positioning, with a processor, the vehicle with respect to the obstacle to improve the view of the second lane by the first sensing device without significantly obstructing an opposing lane;
determining a second path that circumnavigates the obstacle and rejoins the intended path;
monitoring the second lane via the first sensing device to determine when the second path is clear; and
moving the vehicle along the second path when it is determined that the second path is clear.

2. The method of claim 1, further including:
determining, while moving the vehicle along the second path, that the obstacle has begun to move;
determining whether the vehicle has committed to the second path;
completing the movement along the second path when it is determined that the vehicle has committed to the second path; and
aborting the movement along the second path when it is determined that the vehicle has not committed to the second path.

3. The method of claim 1, wherein the first sensing device is a forward-facing radar sensor.

4. The method of claim 1, wherein the obstacle is a double parked vehicle.

5. The method of claim 1, further including estimating, by a processor, a length of the obstacle via the sensor data, and determining the second path in part based on the estimated length of the obstacle.

6. The method of claim 5, wherein estimating the length of the obstacle includes measuring, via lidar sensor data, a distance between opposing edges of the obstacle.

7. The method of claim 1, wherein positioning the vehicle includes altering at least one of a pose and a position of the vehicle such that a portion of the vehicle partially extends beyond a line between the first lane and the opposing lane.

8. The method of claim 1, wherein the second lane is an opposing lane, and wherein the positioning of the vehicle is performed iteratively, by the processor, until the view of the second lane by the first sensing device is improved by a predetermined amount.

9. A system for controlling a vehicle, comprising:
a non-transitory computer readable medium comprising:
an obstacle detection module configured to, by a processor:
receive, via one or more sensing devices, sensor data relating to an environment associated with a vehicle;
determine, with the sensor data, the presence of an obstacle that at least partially obstructs an intended path of the vehicle in a first lane adjacent to a second lane and at least partially occludes a view of the second lane by a first sensing device of the one or more sensing devices;
a positioning module configured to, by a processor:
position, the vehicle with respect to the obstacle to improve the view of the second lane by the first sensing device without significantly obstructing the second lane;
determine a second path that circumnavigates the obstacle and rejoins the intended path; and
a clearing module configured to, by a processor:
monitor the second lane via the first sensing device to determine when the second path is clear; and move the vehicle along the second path when it is determined that the second path is clear.

10. The system of claim 9, wherein the clearing module further:
determines, while moving the autonomous vehicle along the second path, that the obstacle has begun to move;
determines whether the vehicle has committed to the second path; and
completes the movement along the second path when it is determined that the vehicle has committed to the second path, and aborts the movement along the second path when it is determined that the vehicle has not committed to the second path.

11. The system of claim 9, wherein the first sensing device is a forward-facing radar sensor.

12. The system of claim 9, wherein the obstacle is a double parked vehicle.

13. The system of claim 9, wherein the positioning module further estimates a length of the obstacle via the sensor data, and determines the second path in part based on the estimated length of the obstacle.

14. The system of claim 13, wherein the positioning module estimates the length of the obstacle by measuring, via lidar sensor data, a distance between opposing edges of the obstacle.

15. The system of claim 9, wherein the vehicle is positioned by altering at least one of a pose and a position of the vehicle such that a portion of the vehicle partially extends beyond a line between the first lane and the second lane.

16. The system of claim 9, wherein the vehicle is positioned by iteratively changing the position and the pose of the vehicle until the view of the second lane by the first sensing device is improved by a predetermined amount.

17. An autonomous vehicle, comprising:
a plurality of sensing devices that provide sensor data; and
a controller that, by a processor and based on the sensor data:
receives, via one or more sensing devices, sensor data relating to an environment associated with a vehicle;
determines, with the sensor data, a presence of an obstacle that at least partially obstructs an intended path of the autonomous vehicle in a first lane adjacent to a second lane and at least partially occludes a view of the second lane by a first sensing device of the one or more sensing devices;
positions, with a processor, the vehicle with respect to the obstacle to improve the view of the second lane by the first sensing device without significantly obstructing the second lane;
determines a second path that circumnavigates the obstacle and rejoins the intended path;
monitors the opposing lane via the first sensing device to determine when the second path is clear; and
moves the vehicle along the second path when it is determined that the second path is clear.

18. The autonomous vehicle of claim 17, wherein the controller is further configured to:
determine, while moving the autonomous vehicle along the second path, that the obstacle has begun to move;
determine whether the vehicle has committed to the second path; and
complete the movement along the second path when it is determined that the vehicle has committed to the second path, and aborts the movement along the second path when it is determined that the vehicle has not committed to the second path.

19. The autonomous vehicle of claim 17, wherein the first sensing device is a forward-facing radar sensor.

20. The autonomous vehicle of claim 17, wherein the obstacle is a double parked vehicle.

\* \* \* \* \*